(12) United States Patent
Wehrenberg

(10) Patent No.: US 7,881,167 B1
(45) Date of Patent: Feb. 1, 2011

(54) SYSTEMS AND METHODS OF SHOCK RECOVERY IN WRITABLE OPTICAL DISC SYSTEMS

(75) Inventor: Paul J. Wehrenberg, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 692 days.

(21) Appl. No.: 11/234,779

(22) Filed: Sep. 23, 2005

(51) Int. Cl.
*G11B 7/00* (2006.01)
*G11B 20/10* (2006.01)
*G11B 20/18* (2006.01)

(52) U.S. Cl. .............. 369/44.33; 369/44.32; 369/47.14; 369/53.15; 369/53.7

(58) Field of Classification Search ............... 369/44.33, 369/44.32, 47.14, 53.15, 53.17
See application file for complete search history.

(56) References Cited

U.S. PATENT DOCUMENTS

| | | | | |
|---|---|---|---|---|
| 4,796,247 A | * | 1/1989 | Vogelsang | 369/44.28 |
| 5,212,678 A | * | 5/1993 | Roth et al. | 369/47.33 |
| 5,862,113 A | * | 1/1999 | Tsuyuguchi et al. | 369/53.18 |
| 5,995,462 A | * | 11/1999 | Harold-Barry | 369/53.18 |
| 6,115,337 A | * | 9/2000 | Takagi et al. | 369/47.33 |
| 6,178,058 B1 | * | 1/2001 | Pan et al. | 360/60 |
| 6,404,714 B1 | * | 6/2002 | Choi | 369/53.12 |
| 6,526,476 B2 | * | 2/2003 | Wilson et al. | 711/112 |
| 7,489,601 B2 | * | 2/2009 | Omori et al. | 369/44.14 |
| 2002/0024893 A1 | * | 2/2002 | Hashimoto | 369/30.32 |

* cited by examiner

*Primary Examiner*—Wayne R Young
*Assistant Examiner*—Aneeta Yodichkas
(74) *Attorney, Agent, or Firm*—Beyer Law Group LLP

(57) ABSTRACT

Data recovery methods for use with a writable disc system having a writable media are presented including: detecting a write disruption in response to a shock event, the write disruption being defined by a disruption start point, a portion of off-track writing which may include a set of disruption cross-track points that contains at least one disruption cross-track point, and a disruption stop point; stopping a first write operation pertaining to a stream of data in response to a detected shock event, the shock event occurring while the writable disc system is performing the first write operation along a write track; determining whether a first data of the stream of data written in the first write operation located in the region of write disruption is readable; and if the first data is readable, resuming the first write operation.

24 Claims, 4 Drawing Sheets

SYSTEMS AND METHODS OF SHOCK RECOVERY IN WRITABLE OPTICAL DISC SYSTEMS

BACKGROUND

Optical storage systems have become a commonplace technology in modern computing systems. Nearly all computing systems now come equipped with the ability to read and write data on CD's while newer systems are being fitted with DVD read/write systems. Interestingly, the form factor for CD media and DVD media are substantially identical. The ability to put more data in the same space has come about with the use of shorter wavelengths for reading and writing, smaller track pitch, and multiple layers. Indeed, where CD technologies may currently provide approximately 700 MB of storage/CD, DVD technologies may currently provide approximately 8.5 GB of storage. While these storage systems have provided users with the ability to easily store large quantities of data, they are not without their limitations.

For example, writing to blank write once optical discs, such as CD-R, DVD-R, WORM, and the like, occasionally fails due to shocks or bumps delivered to the system during write operations. When a shock event of sufficient magnitude occurs, an optical drive may write off-track or lose focus rendering an optical disc unreadable in which cases the drive informs the system of a burn failure. Such shock events result in loss of media as well as time spent in writing data to the media up to the point of burn failure. In contrast, read errors do not generally render a disc unreadable because the data is typically not corrupted. Rather, read errors generally require nothing more than realigning a read seeking the optical head to continue backward and re-reading the data.

In addition, because of wide proliferation in portable computing systems, optical write systems are much more likely to experience shock events due to the nature and use of portable computing systems. Indeed, some portable computing systems may be configured with inertial damping devices provided to lower the rate of shock event related failures. Finally, as optical storage systems continue to evolve, shorter wavelengths, smaller track pitch, and multiple layers may be utilized to provide increased data density which may, in turn, contribute to increased write failure rates by effectively making systems more sensitive to shock events due to decreased tolerances.

What is needed is a system that provides improved protection from shock events in modern computing systems that is transparent to a user. Therefore, systems and methods of shock recovery in writable optical disk systems are presented herein.

SUMMARY

Data recovery methods for use with a writable disc system having a writable media are presented including: detecting a write disruption in response to a shock event, the write disruption being defined by a disruption start point, a portion of off-track writing which may include a set of disruption cross-track points that contains at least one disruption cross-track point, and a disruption stop point; stopping a first write operation pertaining to a stream of data in response to a detected shock event, the shock event occurring while the writable disc system is performing the first write operation along a write track; determining whether a first data of the stream of data written in the first write operation located in the region of write disruption is readable; and if the first data is readable, resuming the first write operation starting from the disruption start point along the write track using a second data of the stream of data, the second data immediately following the first data, the first data representing the last readable data that is written along the write track prior to the disruption start point. In some embodiments, the detecting the write disruption includes: reading the first data; comparing buffered data in a data buffer to the first data, the buffered data representing a stored copy of a recently-written portion of the stream of data; if the buffered data does not match the first data, reading the a written portion of the write track to ascertain the disruption start point, and any of the set of disruption cross-track points. In some embodiments, the determining whether the first data of the stream of data written in the first write operation located in the region of write disruption is readable includes utilizing error detection coding. In some embodiments, the determining whether the first data of the stream of data written in the first write operation located in the region of write disruption is readable further includes utilizing error correction coding. In some embodiments, methods further include providing an error warning if the first data is unreadable.

In other embodiments, data recovery methods for use with a writable optical disc system having a writable optical disc are presented including: performing a first write operation to write a stream of data to the writable optical disc, the first write operation including buffering to a buffer recently-written portion of the stream of data as buffered data while writing to the writable optical disc; detecting a shock event; stopping the first write operation responsive to the shock event, the shock event occurring while performing the first write operation along a write track on the writeable optical disc; detecting a write disruption in response to the shock event, the write disruption being defined by a disruption start point, a portion of off-track writing which may include a set of disruption cross-track points that contains at least one disruption cross-track point, and a disruption stop point, the detecting including reading the first data, comparing buffered data in a data buffer to the first data, the buffered data representing a stored copy of a recently-written portion of the stream of data, and reading, if the buffered data does not match the first data, reading the a written portion of the write track to ascertain the disruption start point, and any of the set of disruption cross-track points; determining whether a first data of the stream of data written in the first write operation located in the region of write disruption is readable; and if the first data is readable, resuming the first write operation starting from the disruption start point along the write track using a second data of the stream of data, the second data immediately following the first data, the first data representing the last readable data that is written along the write track prior to the disruption start point.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, magneto-optic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
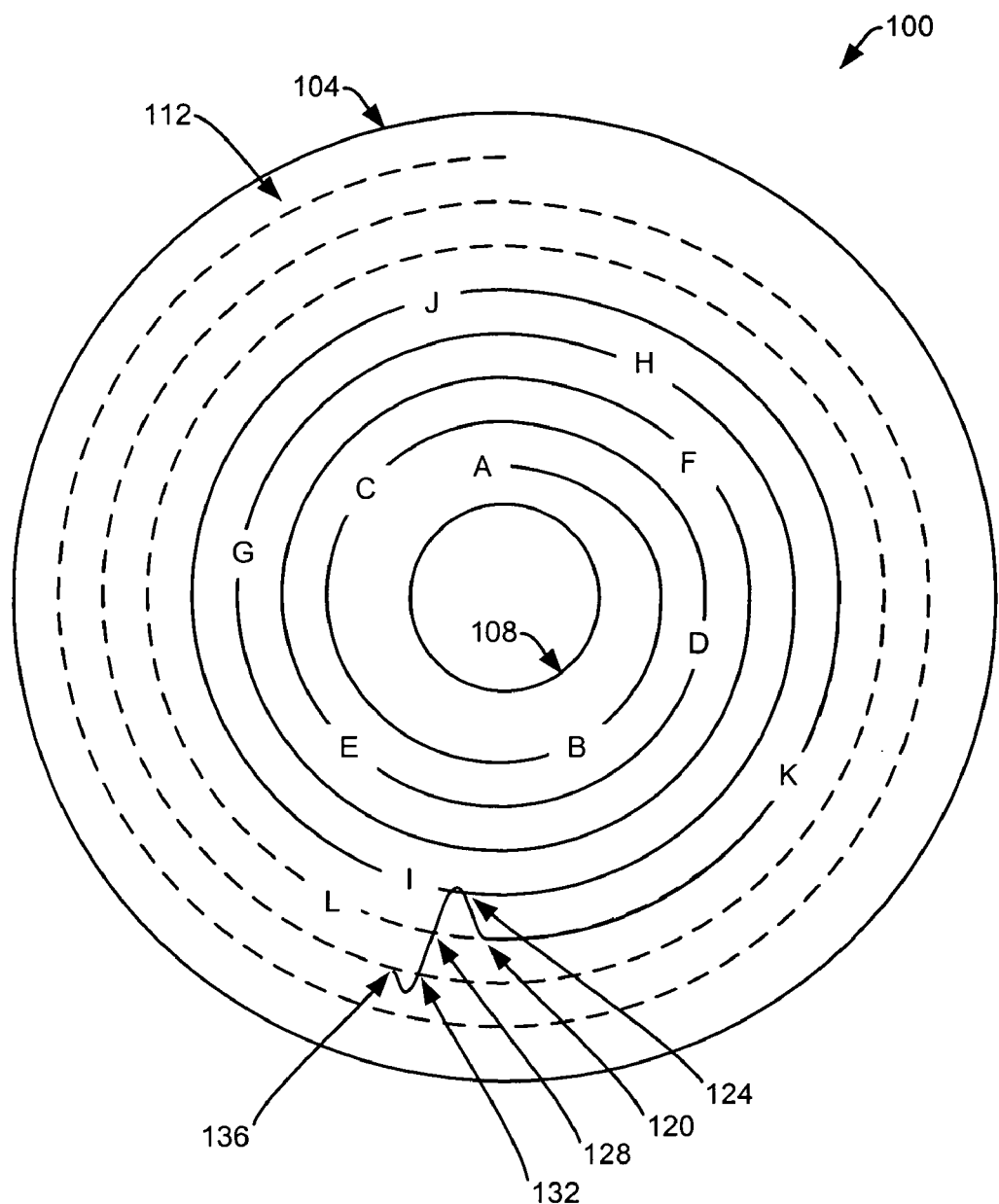
FIG. 1 is an illustrative representation of a write disruption on an optical media.

FIG. 1 is an illustrative representation of a write disruption on an optical media 100. In particular, optical media 100 includes an inside edge 108 and an outside edge 104. As may be appreciated, optical media may include, for example, without limitation any of the following: CD-R, DVD-R, DVD+R, WORM, CD-RW, DVD-RAM, DVD-RW, DVD+RW, MO, DataPlay, and the emerging blue laser optical disc technologies. Typically, writing on optical media occurs from inside edge to outside edge along a write track 112. Write track 112 includes a portion containing no data (i.e. has not been written with data) as illustrated by a dashed line. Write track 112 further includes a portion containing data (i.e. has been written with data) as illustrated by a solid line. Lettered sectors A-L indicate blocks of data. These blocks of data correspond to a memory buffer which is utilized by embodiments of the present invention and will be discussed in further detail below.

Points 120-136 inclusive represent a write disruption. A write disruption may be defined by a disruption point 120, a region of off-track writing which may include one or more cross-track points 124-132, and a disruption stop point 136. Disruption point 120 is the point at which a shock event has occurred. A shock event, for purposes of this disclosure, is an event that exerts a physical force upon an optical disc system such as a shock resulting from dropping a portable computing system containing an optical disc system. The amount of shock required to cause a write disruption varies from system to system depending on any number of factors including, for example, inertial damping mechanisms and data density.

After a shock event has occurred at disruption point 120, a write head may continue to write across one or more cross-track points. Cross-track point 124 is a write across a portion of the write track that all ready contains data. This type of error may, in prior art examples, corrupt already present data. Cross-track points 128 and 132 are writes across portions of the write track not containing any data. This type of error may, in some examples, block writing of data to that portion of the write track. Disruption stop point 136 is the point at which the write head has stopped writing to the optical media. The amount of time a write head takes before stopping varies from system to system depending on manufacturer specifications. Typically, a disruption stop point is created by controller that detects off-axis tracking. It may be appreciated that the illustrated write disruption is not intended to be limiting. Indeed, a write disruption may, in some examples, write across many more or fewer portions of the write track.

Figure 2:
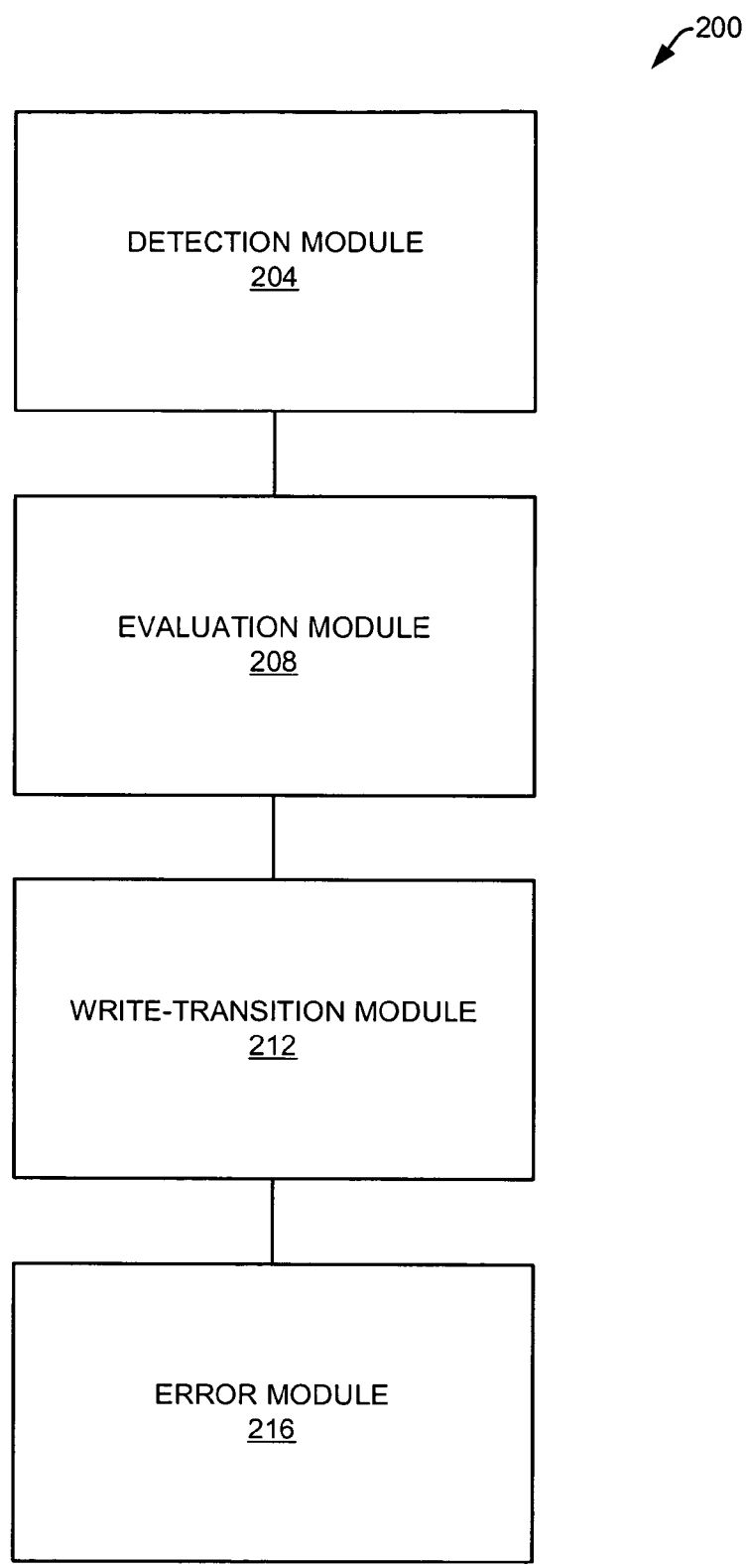
FIG. 2 is an illustrative representation of a system for shock event recovery in accordance with an embodiment of the present invention.

FIG. 2 is an illustrative representation of a system 200 for shock event recovery in accordance with an embodiment of the present invention. In particular, FIG. 2 illustrates functional module for a shock event recovery system. Detection module 204 may be configured for detecting a write disruption in response to a shock event. As noted above, a write disruption may be defined by a disruption point, one or more cross-track points, and a disruption stop point (see FIG. 1). Detection is generally well-known in the art and may be accomplished in any manner known therein without departing from the present invention. In one embodiment, detection is determined by comparing a written portion with a corresponding memory buffer. A memory buffer is data being held in computing system memory corresponding to data written to the optical disc. That is, a copy of data being written to disc is preserved in memory so that discrepancies may be detected. The size of memory buffer may be selected in accordance with user preferences. Generally, a shock event results in a write disruption affecting only a small portion of the write track. Thus, in some embodiments, size of a memory buffer may be far less than actual disc capacity.

A next module, evaluation module, 206 may be configured to determine whether optical media is readable across a write disruption. As noted above, write disruptions may occur across written or unwritten portions of a write track. Where a write occurs across a written portion of a write track, evaluation module 206 may evaluate that portion to determine its readability. Typically, readability operations are performed using error correction coding and error detection coding.

A next module, write-transition module 212 may be configured to write across a write disruption. As noted above, a write disruption may occur across written or unwritten portions of a write track. When an unwritten portion of a write track is affected by a write disruption (i.e. at a cross-track point), write-transition module 212 writes to the optical disc and then performs integrity checks for written data. Integrity checks may be performed by using, in some embodiments, error correction coding and error detection coding. Write-transition module 212 handles write operations until portions affected by a write disruption are no longer available for receiving data. Write operations may then be resumed by the optical disc system.

In some examples, a shock event may occur that renders a disc unreadable. In those examples, either written portions of a disc have become unreadable or unwritten portions of a disc are rendered unusable. For those instances, an error module 216 may be configured to return an error to a user. Errors may be return by any manner well-known in the art without departing from the present invention. In some embodiments, error module 206 may be configured with a log having a time stamp or location stamp such that data write failures may be tracked.

Figure 3:
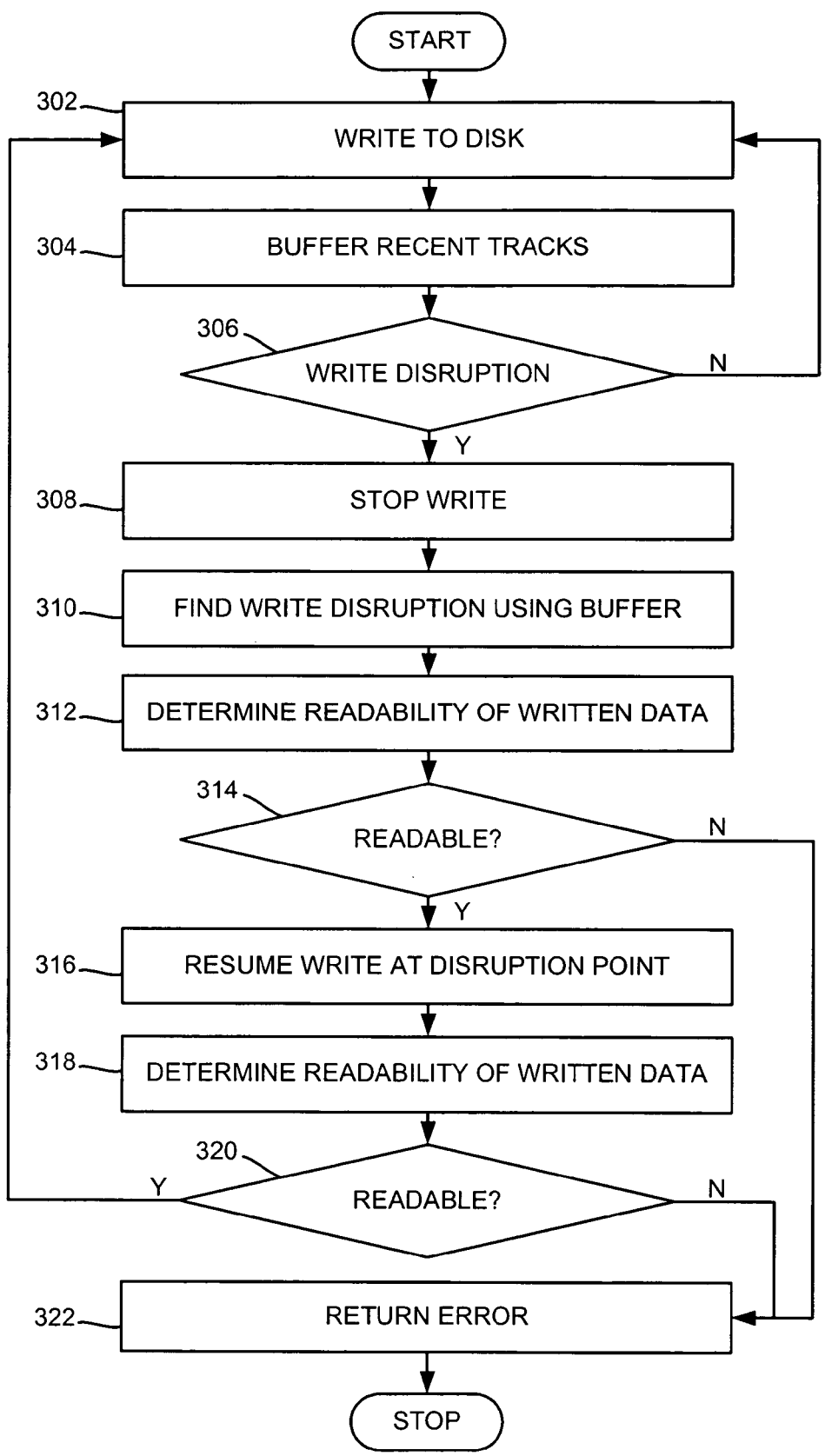
FIG. 3 is an illustrative flowchart of a method of shock event recovery in accordance with an embodiment of the present invention.

FIG. 3 is an illustrative flowchart of a method of shock event recovery in accordance with an embodiment of the present invention. At a first step 302, a write to disc operation is conducted. As noted above, embodiments of the present invention may include any number of optical discs such as: CD-R, DVD-R, DVD+R, WORM, CD-RW, DVD-RAM, DVD-RW, DVD+RW, MO, DataPlay, and the emerging blue laser optical disc technologies. Writing to disc is generally well-known in the art. While write operations continue, recent portions of a write track are buffered in memory. Buffering data in memory allows for a data integrity check in the event of a shock event. The size of memory buffer may be selected in accordance with engineering estimates of the extent of disruption areas associated with shock events. Generally, a shock event results in a write disruption affecting only a small portion of the write track. Thus, size of a memory buffer may be far less than actual disc capacity. In other embodiments, memory buffer size may be approximately equal to actual disc capacity.

At a next step 306, the method determines whether a write disruption has occurred. Typically, a controller detects whether an off-track condition exists. Detection of an off-track condition may be accomplished using any method well-known in the art. If the method determines that no write disruption has occurred, the method continues to a step 302 to write to disc. If the method determines that a write disruption has occurred, the method continues to a step 308 to stop writing operations. Writing operations must be stopped in order to terminate a write disruption.

The method then finds a write disruption using buffered data at a step 310. As noted above, a write disruption may be defined by a disruption point, a region of off-track writing which may include one or more cross-track points, and a disruption stop point (see FIG. 1). Thus, the method seeks backward and then reads forward to determine a disruption point and any cross-track points. Disruption points and cross-track points are determined by comparing data in a memory buffer (buffered data) against data on a write track and finding discrepancies between buffered data and data on a write track. As noted above, the size of memory buffer may be selected in accordance with user preferences. Generally, a shock event results in a write disruption affecting only a small portion of the write track. Thus, in some embodiments, size of a memory buffer may be far less than actual disc capacity. In other embodiments, memory buffer size may be approximately equal to actual disc capacity.

In other embodiments, a disruption point may be located by reading the write track to discover where write modulation substantially ceases. That is, because a shock event results in off-track writing, then by reading the write track, a drive controller may discover a point at which writing has ceased. The point at which writing has ceased is a disruption point. The disruption point may then be recorded or stored.

Once a write disruption is determined, the method may then check the integrity of the data written to the portion affected by the write disruption at a step 312. The method may utilize error correction coding and error detection coding to determine readability of data on written portions of the optical disc. If the method determines, at a step 314, that the data is not readable, the method continues to a step 322 to return an error whereupon the method ends. If the method determines, at a step 314, that the data is readable, the method resumes writing at the disruption point at a step 316. The method, in resuming write operations, continues at the disruption point such that the data is contiguous. That is, the write operation continues as though a write disruption did not occur or, in other words, write continues at the next writable portion along the write track following the disruption start point with data that would have otherwise been written to the write track had the write disruption not occurred. In this manner, data written during a write disruption (e.g. data written off-track) may be correctly written to a write track beginning at a disruption point. For example, if a write operation has written to blocks A-K (see FIG. 1) and a shock event causing a write disruption occurs in a portion between K and L, when write operations continues at a step 316, the method returns to the portion between K and L and finishes writing that portion as though a write disruption had not occurred, thus ensuring data continuity.

At this point, the method has located the write disruption; determined whether any portion of the write track containing data that has been affected by the write disruption is readable; and started a write operation at the disruption point. As the write operation continues, there may be portions of the write track that have been affected by the write disruption that previously contained no data. Those portions must be checked for data integrity after data is written to them. As such, the method continues to check the integrity of the data written to the portion affected by the write disruption at a step 318. The method may utilize error correction coding and error detection coding to determine readability of data on written portions of the optical disc. If the method determines, at a step 320, that the data is not readable, the method continues to a step 322 to return an error whereupon the method ends. If the method determines, at a step 320, that the data is readable, the method resumes writing at a step 302.

Figure 4:
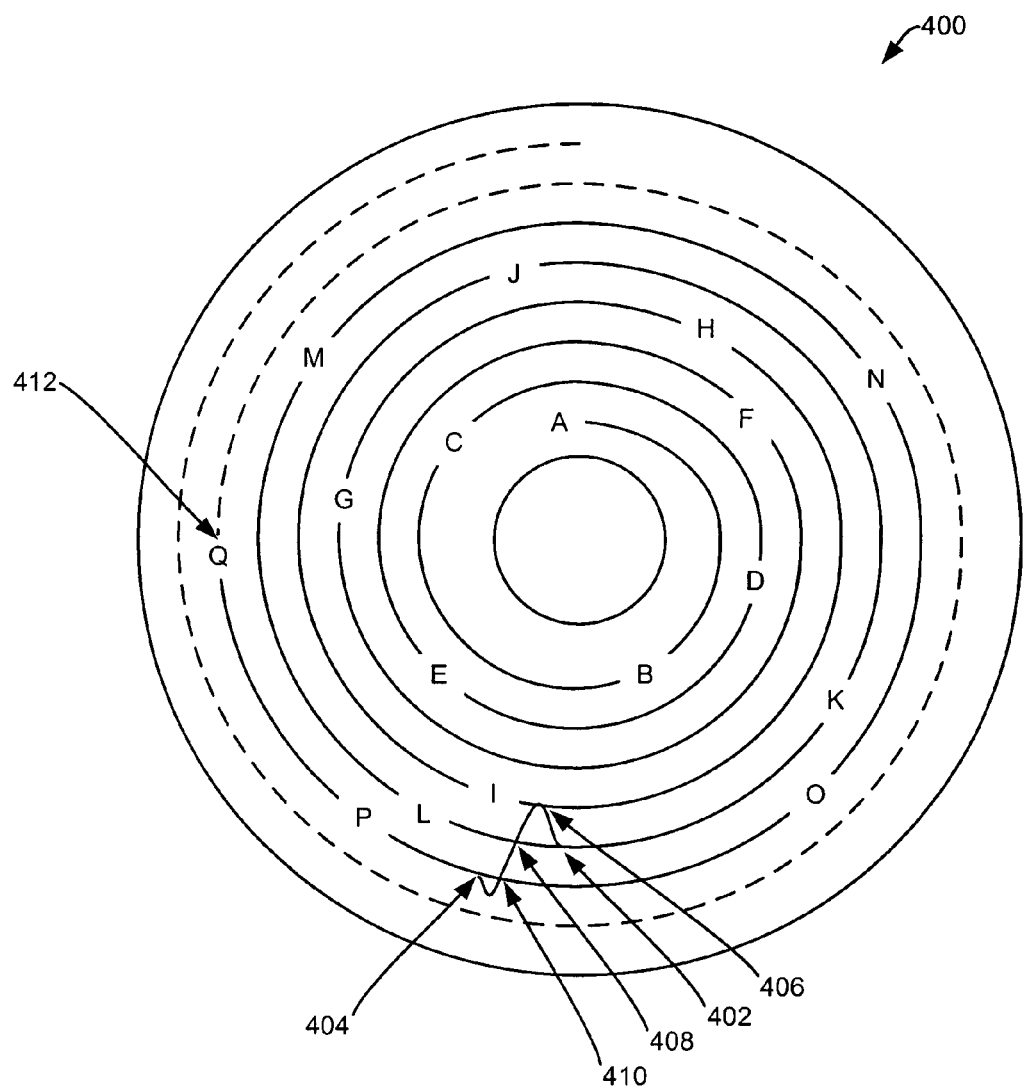
FIG. 4 is an illustrative representation of recovered optical media in accordance with an embodiment of the present invention.

FIG. 4 is an illustrative representation of recovered optical media 400 in accordance with an embodiment of the present invention. As illustrated, methods described herein have found disruption point 402, disruption stop point 404, and disruption cross-track points 406-410. Disruption cross-track point 406 was a point found on a portion containing data that was affected by a write disruption. Disruption cross-track points 408-410 were points found on a portion not containing data. The method has written through cross-track points 408-410 and is currently at write point 412. As noted above, methods described herein check data integrity of both written and unwritten portions of the write track. As can be appreciated, a write disruption is not necessarily erased or overwritten. In the example of a write once disc, disruption cross-track points may be treated as physical disc errors that are easily handled by conventional error correction coding schemes. In the example of a read/write disc, disruption cross-track points may be simply overwritten with new data or, like the write one disc, may be treated as physical disc errors.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A data recovery method for use with a writable disc system having a writable media, the method comprising:
   detecting a write disruption in response to a shock event;
   stopping a first write operation pertaining to a stream of data in response to said shock event, the shock event occurring while the writable disc system is performing the first write operation along a write track;
   after the stopping, ascertaining, using buffered data, at least a disruption start point and a set of disruption cross-track points, wherein at least the disruption start point, the set of disruption cross-track points, and a disruption stop point define the write disruption;

after the ascertaining, determining whether first data of the stream of data written in the first write operation is readable, the first data being written along the write track prior to the disruption start point;

if the first data is readable according to the determining, resuming the first write operation starting from the disruption start point along the write track using second data of the stream of data, the second data immediately following the first data in the stream of data; and verifying whether the second data written by the resuming the first write operation is readable from the writable media.

2. The method of claim 1 wherein the detecting the write disruption includes:

reading the first data comparing buffered data in a data buffer to the first data, the buffered data representing a stored copy of a recently-written portion of the stream of data;

if the buffered data does not match the first data, reading the written portion of the write track to ascertain the disruption start point, and any of the set of disruption cross-track points.

3. The method of claim 1 wherein the determining whether the first data of the stream of data is readable includes utilizing error detection coding.

4. The method of claim 3 wherein the determining whether the first data of the stream of data is readable further includes utilizing error correction coding.

5. The method of claim 1 further comprising providing an error warning if the first data is unreadable according to the determining.

6. The method of claim 1 further comprising providing an error warning if the second data written by the resuming the first write operation is unreadable according to the verifying.

7. The method of claim 1 further comprising continuing to write data from the stream of data to the writable media after the second data is written.

8. The method of claim 1 wherein the writable disc system presents an optical storage system.

9. The method of claim 1 wherein the detecting a write disruption comprises:

reading the write track;

finding a point in the write track at which readable write modulation substantially ceases; recording the point in a drive controller as the disruption point.

10. A data recovery method for use with a writable optical disc system having a writable optical disc, the method comprising:

performing a first write operation to write a stream of data to the writable optical disc, the first write operation including buffering to a buffer recently-written portion of the stream of data as buffered data while writing to the writable optical disc;

detecting a shock event;

stopping the first write operation responsive to the shock event, the shock event occurring while performing the first write operation along a write track on the writable optical disc;

detecting a write disruption in response to the shock event;

after the stopping, ascertaining a disruption start point, a portion of off-track writing which includes a set of disruption cross-track points that contains at least one disruption cross-track point, and a disruption stop point, wherein at least the disruption start point, the disruption stop point, and the set of disruption cross-track points define the write disruption;

after the ascertaining, determining whether first data of the stream of data written in the first write operation along the write track prior to the disruption start point is readable, if the first data is readable according to the determining, resuming the first write operation starting from the disruption start point along the write track using second data of the stream of data, the second data immediately following the first data in the stream of data, the first data representing the last readable data that is written along the write track prior to the disruption start point; and verifying whether the second data written by the resuming the first write operation is readable from the writable media.

11. The method of claim 10 wherein the determining whether the first data of the stream of data is readable includes utilizing error detection coding.

12. The method of claim 10 wherein the determining whether the first data of the stream of data is readable further includes utilizing error correction coding.

13. The method of claim 10 further comprising providing an error warning if the first data is unreadable according to the determining.

14. The method of claim 10 further comprising:

providing an error warning if the second data written by the resuming the first write operation is unreadable according to the verifying.

15. The method of claim 10 further comprising continuing to write data from the stream of data to the writable media after the second data is written.

16. The method of claim 10 wherein the writable optical disc represents a rewritable optical disc.

17. The method of claim 10 wherein the writable optical disc represents a peripheral device in a computer system.

18. The method of claim 17 wherein the writable optical disc is selected from the group consisting of: is selected from the group consisting of: CD-R, DVD-R, DVD+R, WORM, CD-RW, DVD-RAM, DVD-RW, DVD+RW, MO, DataPlay, and emerging blue laser optical disc technologies.

19. The method of claim 10 further comprising marking a location on the writable optical disc that corresponds to the at least one disruption cross-track point as a physical disc defect, thereby preventing the location from being accessed thereafter for one of a data reading task and a data writing task.

20. A computer system configured for data recovery in a writable disc system having a writable media, the computer system comprising:

a detection module for detecting a write disruption in response to a shock event;

a controller stopping a first write operation pertaining to a stream of data in response to the shock event, the shock event occurring while the writable disc system is performing the first write operation along a write track;

a memory buffer for storing buffered data, wherein the buffered data is use to ascertain, after the stopping, at least a disruption start point and a set of disruption cross-track points, wherein at least the disruption start point, the set of disruption cross-track points, and a disruption stop point define the write disruption;

an evaluation module for determining, after the ascertaining, whether first data of the stream of data written in the first write operation is readable, the first data being written along the write track prior to the disruption start point; and a write-transition module for resuming the first write operation starting from the disruption start point along the write track using second data of the stream of data if the first data is readable according to the determining, the second data immediately following the first data in the stream of data, the write-transition module also configured for verifying whether the second data written by the resuming the first write operation is readable from the writable media.

21. The computer system of claim 20, wherein the detecting the write disruption includes:
   reading the first data
   comparing buffered data in a data buffer to the first data, the buffered data representing a stored copy of a recently-written portion of the stream of data;
   if the buffered data does not match the first data, reading the written portion of the write track to ascertain the disruption start point, and any of the set of disruption cross-track points.

22. The computer system of claim 20 wherein the determining whether the first data of the stream of data is readable includes utilizing error detection coding.

23. The computer system of claim 20 wherein the writable disc system presents an optical storage system.

24. The computer system of claim 20 wherein the detecting a write disruption comprises:
   reading the write track;
   finding a point in the write track at which readable write modulation substantially ceases; and
   recording the point in the controller as the disruption point.

* * * * *

UNITED STATES PATENT AND TRADEMARK OFFICE
CERTIFICATE OF CORRECTION

| | | |
|---|---|---|
| PATENT NO. | : 7,881,167 B1 | Page 1 of 1 |
| APPLICATION NO. | : 11/234779 | |
| DATED | : February 1, 2011 | |
| INVENTOR(S) | : Paul J. Wehrenberg | |

It is certified that error appears in the above-identified patent and that said Letters Patent is hereby corrected as shown below:

Title page, Item (75), in column 1, in "Inventor", line 1, delete "Wchrenberg," and insert -- Wehrenberg, --, therefor.

In column 7, line 15, in claim 2, delete "data" and insert -- data; --, therefor.

In column 8, lines 36-37, in claim 18, after "of:" delete "is selected from the group consisting of:".

In column 9, line 10, in claim 21, delete "data" and insert -- data; --, therefor.

Signed and Sealed this
Twenty-ninth Day of November, 2011

David J. Kappos
*Director of the United States Patent and Trademark Office*